(12) United States Patent
Miao

(10) Patent No.: US 7,792,939 B2
(45) Date of Patent: Sep. 7, 2010

(54) METHOD AND SYSTEM FOR OBTAINING SECURE SHELL HOST KEY OF MANAGED DEVICE

(75) Inventor: Fuyou Miao, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 998 days.

(21) Appl. No.: 11/522,592

(22) Filed: Sep. 18, 2006

(65) Prior Publication Data

US 2007/0083665 A1 Apr. 12, 2007

(30) Foreign Application Priority Data

Oct. 10, 2005 (CN) .................. 2005 1 0112548

(51) Int. Cl.
*G06F 15/173* (2006.01)

(52) U.S. Cl. ..................... 709/223; 709/230; 726/6

(58) Field of Classification Search ............... 709/223, 709/230; 726/6
See application file for complete search history.

(56) References Cited

U.S. PATENT DOCUMENTS

| 7,061,900 | B1 * | 6/2006 | Hsieh et al. | 370/351 |
| 7,143,438 | B1 | 11/2006 | Coss et al. | |
| 2004/0268152 | A1 * | 12/2004 | Xia et al. | 713/201 |
| 2005/0038912 | A1 * | 2/2005 | Ghirardi | 709/247 |

FOREIGN PATENT DOCUMENTS

| CN | 1556490 A | 12/2004 |
| CN | 1599330 A | 3/2005 |
| JP | 11-168511 | 6/1999 |
| WO | WO 2007/041918 A1 | 4/2007 |

OTHER PUBLICATIONS

Miao Fuyou Huawei Technologies: "SNMP Agent Discovery under SSH Transport; draft-miao-isms-sshsm-discovery-00.txt" IETF Standard-Working-Draft, Internet Engineering Task Force, IETF, CH, Oct. 17, 2005, XP015042905 ISSN: 0000-0004, pp. 1-6.
Harris B: "Rivest-Shamir-Adleman (RSA) key exchanged for the Secure Shell (SSH) Transport Layer Protocol; draft-harris-ssh--rsa-kex-06.txt" IETF Standard-Working-Draft, Internet Engineering Task Force, IETF, CH, No. 6, Dec. 19, 2005, XP015042231, ISSN: 0000-0004, pp. 2-4.

(Continued)

*Primary Examiner*—Salad Abdullahi
*Assistant Examiner*—El Hadji M Sall
(74) *Attorney, Agent, or Firm*—Slater & Matsil, L.L.P.

(57) ABSTRACT

A method and a system for obtaining a Security Shell (SSH) host key of a managed device, including: while detecting the managed device, the management station obtaining the related information of the SSH host key in a UDP transport mode. According to the present invention, the management station can obtain the SSH host key and at the same time detect the managed device. As a result, the workload of the distribution management of the host key is reduced and the speed of the host key distribution is increased.

19 Claims, 2 Drawing Sheets

OTHER PUBLICATIONS

Harrington Effective Software J Schoenwaelder International University, Bremen J. Salowey Cisco Systems D: "Secure Shell Security Model for SNMP; draft-harrington-isms-secshell- 00.txt"; IETF Standard-Working-Draft, Internet Engineering Task Force, IETF, CH, Sep. 2, 2005, XP015041524, ISSN: 0000-00004, pp. 4-16, 23 and 37-39.

Harrington Effective Software J Schoenwaelder International University, Bremen D: "Transport Mapping Secuirty Model (TMSM) for the Simple Network Management Protocol; draft--ietf-isms-tmsml-00.txt"; IETF Standard-Working-Draft, Internet Engineering Task Force, IETF, CH, vol. isms, Oct. 14, 2005, XP015042452, ISSN: 0000-00004, pp. 1, 4-5, 7-12, 15 and 27-28.

Schlyter Oepnssh W. Griffin Sparta J: "Using DNS to Securely Publish SSH Key Fingerprints; draft-ietf, secsh-dns-05.txt", IETF Standard-Working-Draft, Internet Engineering Task Force, IETF, CH vol. secsh, No. 5, Sep. 5, 2003 L, XP015038937, ISSN: 0000-0004, pp. 4-6.

PCT Written Opinion of the International Searching Authority for PCT/CN2006/001983, mailed Nov. 30, 2006, Applicant: Huawei Technologies Co., Ltd., et al., 5 pages.

* cited by examiner

METHOD AND SYSTEM FOR OBTAINING SECURE SHELL HOST KEY OF MANAGED DEVICE

FIELD OF THE TECHNOLOGY

The present invention relates to communication techniques, and more specifically, to a method and a system for obtaining a Secure Shell (SSH) host key of a managed device.

BACKGROUND OF THE INVENTION

Traditional network service programs, such as File Transfer Protocol (FTP) and Telnet, only adopt simple security authentication without considering security measures in transfer architectures or implementing principles. Therefore, data transferred between users and servers is easily attacked by network hackers. In order to ensure the security of data transfer, the SSH has gradually replaced traditional network service programs for its secure features.

When the SSH is used, an SSH protocol needs to be established on application layer and a transport layer. The SSH protocol mainly includes a transport layer protocol, a user authentication protocol and a connection protocol. Wherein, the transport layer Protocol, which makes use of Transfer Control Protocol (TCP), is used to provide not only security measures, such as authentications, credits and integrity validations, but also a data compressing function. The user authentication protocol implemented over the Transport layer Protocol is used to implement identity authentications between servers and clients. The connection protocol implemented over the user authentication protocols is used to allocate multiple encrypted channels to some logical channels. Users can encrypt and compress all transferred data by using the SSH, thereby ensuring the security of data, and accelerating the speed of data transfer.

Simple Network Management Protocol (SNMP), which is implemented between a network management agent software operating on the managed device and a network management station, is a sort of standard protocol that is used to manage network devices, such as a server, a work station, a router, a switch and a hub etc. And it is an application layer protocol.

In consideration of the security of the SNMP, the Internet Engineering Task Force (IETF) has proposed an SNMPv3 standard. In the SNMPv3 standard, a user-based security model (USM) and a view based access control model (VACM) are added. Wherein, the USM security model requests that a security parameter, such as a share key, be configured in each pair of two SNMP engines communicating with each other. In general networks, one managed device may be managed by multiple network management stations. While at the same time, one network management station may need to manage a mass of devices. Therefore, the workload of configuring security parameters is generally very heavy.

To solve this problem, the IETF puts forward that the SSH can be used to transfer the SNMPv3 protocol. In order to reduce the cost of a device detecting procedure, a method which combines the SSH transport and user datagram protocol (UDP) is proposed. That is, the network management station uses the SNMP in a UDP transport mode to detect the managed device and uses the SNMP in an SSH transport mode to manage the managed device. Specifically, when the UDP transport mode is used, since there may be no share key between the network management station and the device to be detected, the communication security level of the SNMPv3 communication will be configured to be noAuthNoPriv, which means no packet validation and no secrecy measures are needed. In this way, the USM of the SNMP needs not to implement validations and encryptions for packets, thereby reducing the cost of the device detecting. And since the detected device performs no access control on the SNMP system information, the user can obtain the system information even without a validation. When a connection is established by using the SSH to transfer the SNMP, the managed device is operated by an Out-of-Band management firstly, that is, obtaining the host key by a manual configuration and then an identity authentication is implemented to a network management station server based on the obtained host key. When the validation passes, a communication link will be established between the managed device and the server.

SUMMARY OF THE INVENTION

The present invention provides a method for obtaining an SSH host key of a managed device. According to the method, a management station can obtain the SSH host key and the system information of the managed device at the same time. As a result, the workload of a distribution management of the host key is reduced and the speed of the host key distribution is increased, which leads to a more convenient usage.

Besides, the present invention also provides a system for obtaining an SSH host key of a managed device as well. According to the system, a management station can obtain the SSH host key and the system information of the managed device at the same time, thereby increasing the speed of the host key distribution.

The method for obtaining an SSH host key of a managed device according to the present invention, includes: while detecting the managed device, a management station obtaining related information of the SSH host key of the managed device in a UDP transport mode.

Wherein, the steps of obtaining the information of the SSH host key includes: the management station sending a detecting request packet, in which it is indicated that the related information of the SSH host key and the system Management Information Bank (MIB) information of the managed device are needed, to the managed device by means of UDP transport mode; and after receiving the detecting request packet, the managed device sending the related information of the SSH host key and the system MIB information to the management station in the UDP transport mode.

The system for obtaining an SSH host key of a managed device provided by the present invention, includes: a management station and a managed device. While detecting the managed device, the management station obtaining related information of the SSH host key of the managed device in a UDP transport mode.

As can be seen from the method and system provided by the present invention, the management station of the present invention can detect the managed device and obtain the information of the SSH host key in a UDP transport mode at the same time without any intervention of the administrator. As a result, the workload of the management of the host key distribution is reduced and the speed of the host key distribution is increased, which make it more convenient to implement the method and the system.

DETAILED DESCRIPTION OF THE INVENTION

A detailed description of the present invention will be provided hereinafter with reference to the embodiments and the accompanying drawings.

Figure 1:
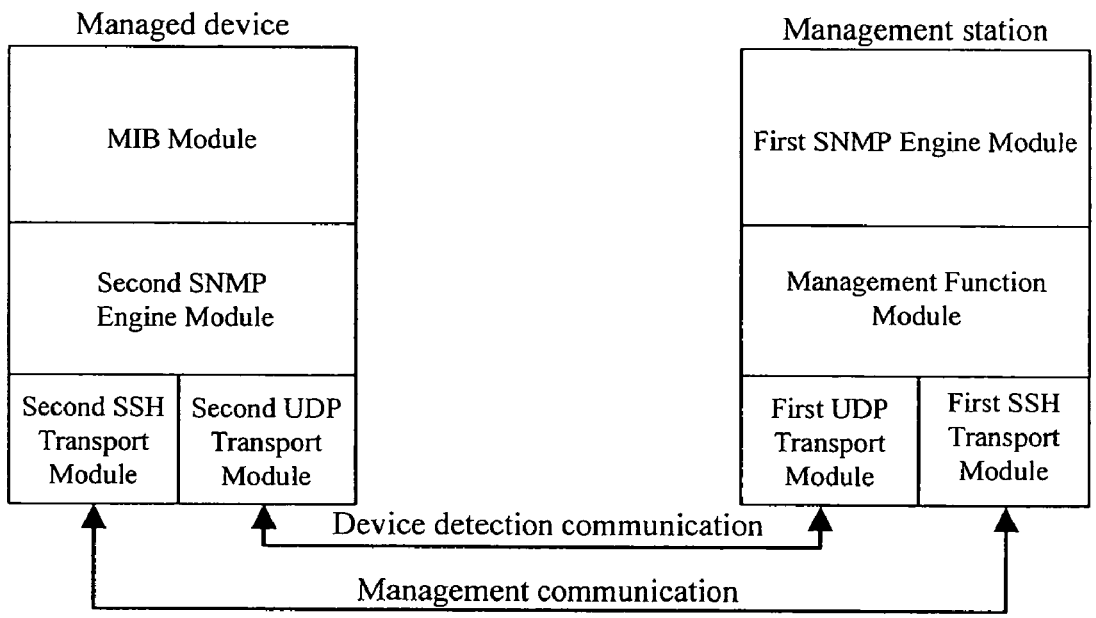
FIG. 1 is a schematic diagram illustrating the architecture of a system in accordance with a preferred embodiment of the present invention.

FIG. 1 illustrates the architecture of a system for obtaining an SSH host key of a managed device in accordance with a preferred embodiment of the present invention. As shown in FIG. 1, the system includes a management station and a managed device. Wherein, the management station further includes a first UDP transport module, a first SNMP engine module, a management function module and a first SSH transport module, such as an SSH client. The managed device further includes a second UDP transport module, a second SNMP engine module, a sort of virtual memory used by network management protocols, that is, a Management Information Bank (MIB) module and a second SSH transport module, such as an SSH server.

Wherein, the combination of the first SNMP engine module and the management function module can be called a first management module, which is used to perform all the functions of the first SNMP engine module and the management function module. The combination of the second SNMP engine module and the MIB module can be called a second management module, which is used to perform all the functions of the second SNMP engine module and the MIB module.

The MIB module of the managed device is used to store system MIB information and host key related information. The MIB module specifically includes a system information MIB module, other MIB modules and a host key MIB module. Wherein, there is one or more host keys stored in the host key MIB Module. The host key MIB module adopts the same security process for the host key as that adopted by the system information MIB module, that is, a noAuthNoPriv processing mode without packet validations and encrypt measures. Moreover, no access control to the host key MIB module is needed.

The management function module of the management station is used to obtain a device identity (ID) of the managed device to be detected, such as a host IP address or a hostname. Wherein, the device ID can be manually inputted or pre-configured by an administrator. Moreover, the specific information inputted or pre-configured may be a single address or an address section. If the specific information is an address section, the management function module will select each address in turn to implement the device detecting operation.

Hereinafter, the procedure of obtaining the SSH host key of the managed device is described in detail through the device detecting procedure of the above system.

During the procedure of a device detecting operation, the management station firstly invokes the first SNMP engine module and the first UDP transport module to send a detecting request UDP packet to the corresponding managed device in a UDP transport mode according to the device ID of the managed device. Moreover, the management station indicates that it needs to obtain the system MIB information and the related information of the SSH host key of the managed device through the detecting request UDP packet.

In this step, the step of indicating that the management station needs to obtain the system MIB information and the related information of the SSH host key of the managed device is implemented through an Object ID (OID). As each sort of information corresponds to a unique OID value, the management station can carries the OID that corresponds to the information needed in the detecting request UDP packet to indicate what information is needed. In this way, the managed device could know what information is requested by the management station. In the above steps, the management station can carries the OID corresponding to the system MIB information and the OID corresponding to the related information of the SSH host key of the managed device in the detecting request UDP packet. In this way, the managed device can be informed that the management station needs to obtain the system MIB information and the related information of the SSH host key of the managed device.

After receiving and de-capsulating the detecting request UDP packet sent by the management station, the second UDP transport module of the managed device encapsulates the information indicating that the management station needs the system MIB information and the related information of the SSH host key of the managed device into a Protocol Data Unit (PDU) packet and sends the packet to its second SNMP engine module.

The second SNMP engine module of the managed device encapsulates the system MIB information and the related information of the SSH host key stored in the MIB module into a SNMP PDU packet through interactions with its MIB module according to the request for obtaining the system MIB information and the related information of the SSH host key of the managed device. And then the second SNMP engine module sends the packet to the management station in a UDP transport mode through its second UDP transport module.

The management function module obtains the system MIB information and the related information of the SSH host key of the managed device from the SNMP PDU packet fed back from the managed device by invoking its first SNMP engine module and the first UDP transport module.

Finally, the first SSH transport module of the management station implements an identity authentication for the SSH server of the managed device according to the related information of the host key obtained. After the authentication passes, the first SSH transport module establishes an SSH connection with the second SSH transport module of the managed device and implements corresponding SSH managements to the managed device through the SSH connection.

Thus it can be seen that, through the above system, the management station can obtain the SSH host key and detect the managed device at the same time. As a result, the workload of the management of the host key distribution is reduced and the speed of the host key distribution is increased.

Figure 2:
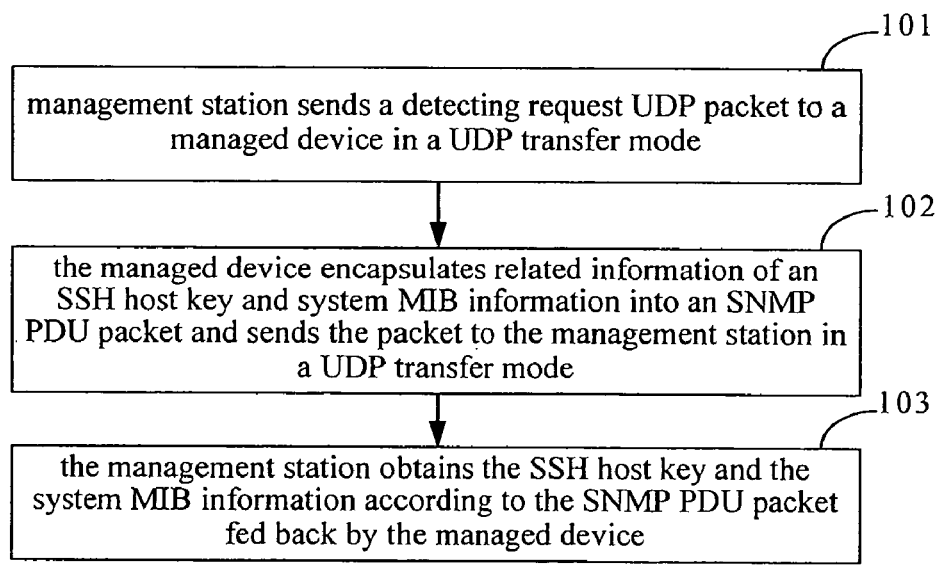
FIG. 2 is a flow chart illustrating a method for obtaining an SSH host key of a managed device in accordance with a preferred embodiment of the present invention.

A method for obtaining an SSH host key of a managed device in accordance with a preferred embodiment of the present invention will be described in detail with reference to FIG. 2 hereinafter. As shown in FIG. 2, the method mainly includes:

Step 101: a management station sends a detecting request UDP packet to a managed device in a UDP transport mode. Wherein the detecting request UDP packet comprises the system MIB information and the related information of the SSH host key of the managed device, which is needed to be acquired.

The specific procedure of this step is as follows.

First, the management station obtains the device ID of the managed device.

Wherein, the device ID of the managed device may be a host IP address or a hostname of the managed device. Wherein, the device ID can be manually inputted or pre-configured by an administrator. Moreover, the specific information inputted or pre-configured may be a single address or an address section. If the specific information inputted or pre-configured is an address section, the management function module will select each address in turn to implement the device detecting operation.

Then, according to the obtained device ID of the managed device, the management station sends the detecting request UDP packet to the managed device corresponding to the device ID in a UDP transport mode. In the detecting request UDP packet, it indicates that is the management station needs to obtain the system MIB information and the related information of the SSH host key of the managed device.

Step 102: after receiving the detecting request UDP packet sent by the management station, the managed device encapsulates the system MIB information and the related information of the SSH host key of the managed device into an SNMP PDU packet. Moreover, the managed device sends the packet to the management station in a UDP transport mode.

The specific procedure of the above step is as follows.

First, after receiving the detecting request UDP packet sent by the management station, the second UDP transport module of the managed device needs to de-capsulate the detecting request UDP packet. Then the managed device re-encapsulates the system MIB information and the related information of the SSH host key of the managed device needed by the management station into a Protocol Data Unit (PDU) packet and sends the packet to its second SNMP engine module.

The second SNMP engine module de-capsulates the PDU packet, and then encapsulates the system MIB information and the related information of the SSH host key stored in the MIB module into a SNMP PDU packet through interactions with its MIB module, according to the needed related information of the SSH host key and the system MIB information of the managed device indicated in the PDU packet. Moreover, the managed device sends the SNMP PDU packet to the management station in a UDP transport mode.

Wherein, the related information of the SSH host key encapsulated in the SNMP PDU packet mainly includes host key information. Besides the host key information, the related information further includes at least one of a host key algorithm, a usage policy, a fingerprint and an associated name.

Wherein, each managed device has a certain usage policy on its host key. The usage policy denotes the condition for using the host key. Each host key can have a fingerprint at the same time. Wherein, the fingerprint, which is used to index the host key or implement a validation of the host key, is generated by implementing some process to the host key, such as a Hash unidirectional function process. Moreover, there may exist a name, which may be a name or an alias or other information of the SSH server, corresponding to each host key.

Step 103: the management station obtains the related information of the SSH host key and the system MIB information according to the SNMP PDU packet fed back by the managed device.

Specifically, the management station receives the SNMP PDU packet in a UDP transport mode. And after de-capsulating the SNMP PDU packet by the first SNMP engine, the related information of the SSH host key and the system MIB information are obtained and stored in a local file or a database.

After the above steps, the management station first implements an identity authentication to the SSH server of the managed device according to the related information of the SSH host key obtained. After the identity authentication passes, an SSH connection will be established. Then, SNMP packets are transferred through the SSH connection. Thus, the managed device is managed through the SNMP packets.

Figure 3:
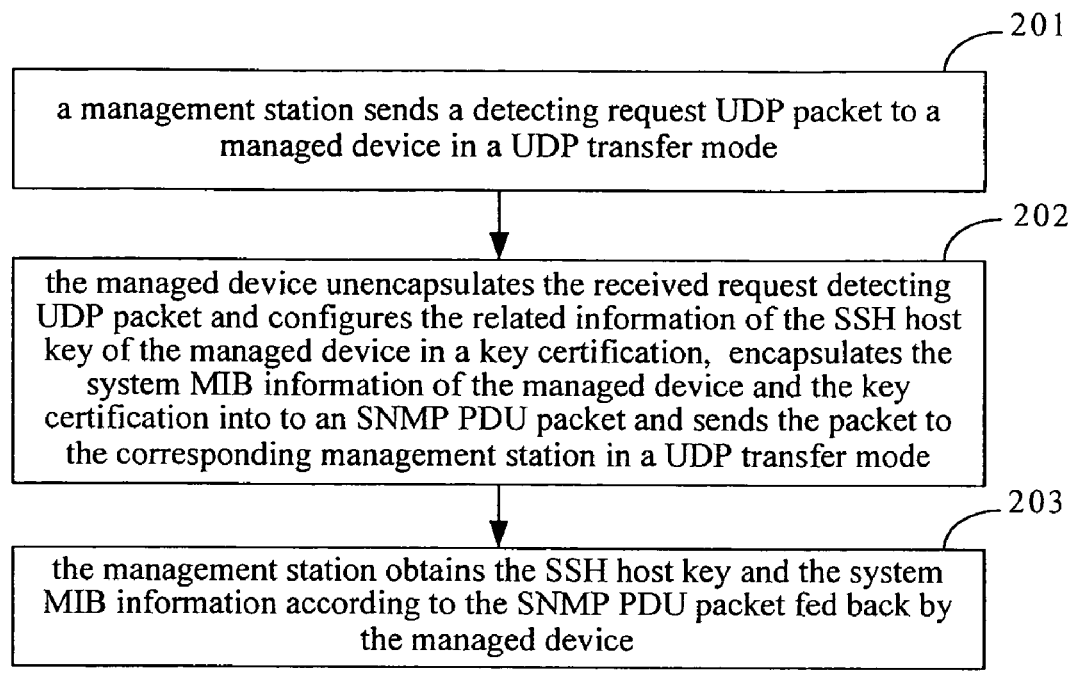
FIG. 3 is a flow chart illustrating a method for obtaining an SSH host key of a managed device in accordance with another preferred embodiment of the present invention.

Besides the above method for obtaining the SSH host key of the managed device, another preferred embodiment of the present invention provides another method for obtaining the SSH host key of the managed device. As shown in FIG. 3, the method includes the following steps.

Step 201: a management station sends a detecting request UDP packet to a managed device in a UDP transport mode. And in the detecting request UDP packet, the management station indicates that it needs to obtain the system MIB information and the related information of the SSH host key of the managed device.

The specific procedure of this step is the same as that of Step 101; therefore no more description will be given.

Step 202: the managed device de-capsulates the received detecting request UDP packet and configures the related information of SSH the host key of the managed device in a key certification, and encapsulates the system MIB information of the managed device and the key certification into an SNMP PDU packet through the SNMP. And then the managed device sends the SNMP PDU packet to the corresponding management station in a UDP transport mode.

The specific procedure of the above step is as follows.

First, after receiving the detecting request UDP packet sent from the management station, the second UDP transport module of the managed device needs to de-capsulate the detecting request UDP packet, and then encapsulates the information indicating that the management station needs the system MIB information and the related information of the SSH host key of the managed device into a PDU packet and sends the packet to its second SNMP engine module.

The second SNMP engine module de-capsulates the PDU packet, configures the related information of SSH the host key of the managed device in the key certification, and encapsulates the system MIB information of the managed device and the key certification into an SNMP PDU packet through interactions with the MIB module, according to the related information of the SSH host key and the system MIB information of the managed device indicated in the PDU packet. And then the managed device sends the SNMP PDU packet to the management station in a UDP transport mode.

As mentioned above, the related information of the SSH host key encapsulated in the SNMP PDU packet mainly includes the host key information. Besides the host key information, the related information may include at least one of a host key algorithm, a usage policy, a fingerprint and an associated name.

Step 203: the management station obtains the related information of the SSH host key and the system MIB information according to the SNMP PDU packet fed back by the managed device.

In this step, the management station firstly receives the SNMP PDU packet in a UDP transport mode through the first UDP transport module, de-capsulates the SNMP PDU packet through the first SNMP engine to obtain the key certification and the system MIB information of the managed device and then stores them in a local file or a database.

After the above steps, the management station firstly implements an identity authentication to the SSH server of the managed device according to the related information of the obtained SSH host key which is included in the key certification. After the identity authentication passes, an SSH connection will be established. Then, the SNMP packets are transferred through the SSH connection. Thus, the managed device can be managed through the SNMP packets.

From the above preferred embodiments, it can be seen that the SSH host key of the managed device is sent in a UDP transport mode, therefore the transfer cost, process cost and management cost of the host key distribution procedure is greatly reduced. Compared to any traditional method for distributing the host key, such as FTP, manually configuring host key files or disk transfer, the implementation cost of the above preferred embodiments is nearly zero and the possibility of man-made mistakes is eliminated as well.

The foregoing are only preferred embodiments of this invention. The protection scope of this invention, however, is not limited to the above description. Any change or substitution, within the technical scope disclosed by this invention, easily occurring to those skilled in the art should be covered by the protection scope of this invention as set by the appended claims.

What is claimed is:

1. A method for obtaining a Secure Shell (SSH) host key of a managed device, comprising:
   sending, by a management station, a detecting request packet, in which it indicates related information of the SSH host key and a system Management Information Bank (MIB) information of the managed device needed to be obtained, to the managed device in a UDP transport mode; and
   receiving from the managed device the related information of the SSH host key and the system MIB information of the managed device in the UDP transport mode.

2. The method according to claim 1, further comprising:
   after receiving the detecting request packet, the managed device sending the related information of the SSH host key and the system MIB information to the management station in the UDP transport mode.

3. The method according to claim 2, wherein, the step of sending the detecting request packet comprises:
   obtaining a device identity (ID) of the managed device; and
   sending the detecting request packet to the managed device in accordance with the device ID in the UDP transport mode.

4. The method according to claim 2, wherein, the step of sending the related information of the SSH host key and the system MIB information to the management station comprises:
   encapsulating the related information of the SSH host key and the system MIB information into Protocol Data Unit (PDU) of a Simple Network Management Protocol (SNMP) packet; and
   sending the encapsulated packet to the management station in the UDP transport mode.

5. The method according to claim 4, wherein, the step of encapsulating the related information of the SSH host key and the system MIB information into the SNMP PDU packet comprises:
   de-capsulating the received detecting request packet;
   encapsulating the related information of the SSH host key and the system MIB information needed to be obtained, which are indicated by the detecting request packet, into the SNMP PDU packet.

6. The method according to claim 4, wherein, the step of encapsulating the related information of the SSH host key and the system MIB information into the SNMP PDU packet comprises:
   de-capsulating the received detecting request packet;
   encapsulating the information indicating that the management station needs to obtain the related information of the SSH host key and the system MIB information into the SNMP PDU packet.

7. The method according to claim 4, wherein, the step of obtaining the related information of the SSH host key and the system MIB information comprises:
   receiving the SNMP PDU packet in the UDP transport mode;
   de-capsulating the SNMP PDU packet and obtaining the relating information of the SSH host key and the system MIB information of the managed device.

8. The method according to claim 1, further comprising:
   after obtaining the related information of the SSH host key and the system MIB information, storing the related information of the SSH host key and the system MIB information in a local file or a database.

9. The method according to claim 1, further comprising:
   the management station implementing an identity authentication to the SSH server of the managed device using the related information of the SSH host key obtained;
   after the authentication passes, the management station establishing an SSH connection with the managed device;
   the management station sending SNMP packets through the SSH connection and managing the managed device through the SNMP packets.

10. The method according to claim 1, wherein, the related information of the SSH host key comprises SSH host key information.

11. The method according to claim 10, wherein, the related information of the SSH host key further comprises at least one of an SSH host key information algorithm, a usage policy, a fingerprint and an associated name.

12. A system for obtaining a Security Shell (SSH) host key of a managed device, comprising: a management station and the managed device, wherein, the management station comprises: a first UDP transport module and a first management module; wherein,
   the first management module sends a detecting request packet, in which it indicates related information of the SSH host key and a system MIB needed to be obtained, to the managed device by invoking the first UDP transport module; and,
   the first management module obtains the related information of the SSH host key and the system MIB information of the managed device according to a UDP packet fed back by the managed device.

13. The system according to claim 12, wherein, the first management module comprises: a first SNMP engine module and a management function module; wherein,
   the first SNMP engine module is used to generate the detecting request packet, send the generated detecting request packet to the management function module, and parse a Simple Network Management Protocol (SNMP) Protocol Data Unit (PDU) packet fed back by the managed device, in which the related information of the SSH host key and the system MIB information of the managed device are encapsulated, to obtain the related information of the SSH host key and the system MIB information of the managed device; and
   the management function module is used to invoke the first UDP transport module to send the detecting request packet to the managed device, receive the SNMP PDU packet and send the SNMP PDU packet to the first SNMP engine module.

14. The system according to claim 12, wherein, the management station further comprises: a first SSH transport module, wherein, the first SSH transport module is used to implement an identity authentication to the SSH server of the managed device according to the related information of the host key obtained; and after the identity authentication passes, establishing an SSH connection with the managed device and performing corresponding SSH management of the managed device through the SSH connection.

15. The system according to claim 13, wherein, the management station further comprises: a first SSH transport module, wherein, the first SSH transport module is used to implement an identity authentication to the SSH server of the managed device according to the related information of the host key obtained; and after the identity authentication passes, establishing an SSH connection with the managed device and performing corresponding SSH management of the managed device through the SSH connection.

16. The system according to claim 12, wherein, the managed device comprises: a second UDP transport module and a second management module; wherein, the second UDP transport module is used to receive and de-capsulate the detecting request packet sent from the management station, and sending the information indicating that the management station needs to obtain the system MIB information and the related information of the SSH host key to the second management module;

the second management module is used to send the related information of the SSH host key and the system MIB information stored in itself to the management station by invoking the second UDP transport module according to the system MIB information and the related information of the SSH host key needed by the management station.

17. The system according to claim 16, wherein, the second managed module comprises: a second SNMP engine module and an MIB module which is used to store the system MIB information and the related information of the SSH host key; wherein, the second SNMP engine module is used to encapsulate the related information of the SSH host key and the system MIB information stored in the MIB module into a SNMP PDU packet according to the system MIB information and the related information of the SSH host key needed by the management station, and send the encapsulated SNMP PDU packet to the management station by invoking the second UDP transport module.

18. The system according to claim 16, wherein, the managed device further comprises:

a second SSH transport module, which is used to establish an SSH connection with the management station and implement information interactions with the management station through the SSH connection.

19. The system according to claim 17, wherein, the managed device further comprises:

a second SSH transport module, which is used to establish an SSH connection with the management station and implement information interactions with the management station through the SSH connection.

* * * * *